United States Patent [19]
Coenders et al.

[11] 3,901,646
[45] Aug. 26, 1975

[54] FURNACE CONSTRUCTION

[75] Inventors: Willi Coenders; Franz Trockel, both of Essen, Germany

[73] Assignee: Heinrich Koopers GmbH, Essen, Germany

[22] Filed: Oct. 16, 1973

[21] Appl. No.: 406,780

Related U.S. Application Data
[62] Division of Ser. No. 300,623, Oct. 25, 1972.

[30] Foreign Application Priority Data
Oct. 26, 1971  Germany............................ 2153225
Feb. 23, 1972  Germany............................ 2208479

[52] U.S. Cl................................ 432/214; 285/226
[51] Int. Cl............................................. F24h 7/00
[58] Field of Search ...... 432/214; 165/9.4; 285/226, 285/227, 228, 229, 301; 277/55, 56

[56]  References Cited
UNITED STATES PATENTS
379,707   3/1888   Laughlin............................ 432/214
1,940,729  12/1933  Pfefferle .............................. 285/13
2,712,456   7/1955  McCreery ........................... 285/226
2,998,270   8/1961  Watkins............................... 285/227
3,214,197  10/1965  Gruber................................. 285/227
3,574,361   4/1971  Contreras ........................... 285/301
3,620,557  11/1971  Sturm .................................. 285/228

Primary Examiner—William E. Wayner
Assistant Examiner—W. E. Tapolcai, Jr.
Attorney, Agent, or Firm—Michael S. Striker

[57]  ABSTRACT

A first tubular socket is connectable to one vessel and has a free end, and a second tubular socket is connectable to another vessel and also has a free end. Each of the free ends is provided with an annular reinforcing member which is rigid with it, and annular shoulders on the reinforcing members engage one behind the other so that the shoulders prevent axial separation of the tubular sockets. The reinforcing members have, however, limited freedom of relative radial movement so that limited relative displacement of the tubular sockets in radial direction is possible.

7 Claims, 2 Drawing Figures

FURNACE CONSTRUCTION

BACKGROUND OF THE INVENTION

This is a division of our application Ser. No. 300,623, filed on Oct. 25, 1972.

The present invention relates to a connecting arrangement, and more particularly to a connecting arrangement for connecting two vessels.

Still more particularly, the invention relates to a connecting arrangement for connecting two vessels which are under elevated interior pressure and/or temperature, and especially of an air heater with a laterally adjacent combustion chamber in a furnace or the like.

In furnaces, for instance, it is common that an air heater or regenerator is arranged laterally adjacent to a furnace or combustion chamber, both of them having an upright orientation. The chamber and the regenerator are connected with one another by tubular sockets between which there is interposed one or more compensating devices. The purpose of such compensating devices is to provide for compensation of radial and axial displacement of the tubular sockets, resulting from thermal expansion and contraction of the sockets and/or the vessels themselves. The forces which act in horizontal direction due to the internal pressures in the vessels and in the tubular sockets, pressures which frequently amount to 5 atms. over pressure and even higher, must be absorbed by appropriately dimensioned fittings on the tubular sockets and other associated components. Evidently, these fittings are relatively expensive, aside from the fact that they necessarily increase the minimum lateral distance which can exist between the regenerator and the combustion chamber. This is undesirable.

SUMMARY OF THE INVENTION

It is therefore a general object of the present invention to overcome the disadvantages of the prior art.

More particularly, it is an object of the present invention to provide a connecting arrangement of the character and for the purposes outlined above, which avoids these disadvantages.

Still more particularly, it is an object of the present invention to provide such a connecting arrangement which is simpler and lighter in its construction than what is known from the prior art, but which is capable of withstanding the forces and thermal expansions and contractions which arise in the conditions in which such an arrangement is to be used.

In keeping with those objects, and others which will become apparent hereafter, one feature of the invention resides in a connecting arrangement of the type under discussion, which comprises a first tubular socket connectable to one vessel and having a free end, and a second tubular socket connectable to another vessel and also having a free end. In addition we provide a pair of annular reinforcing members each of which is rigidly connected with one of the free ends, and these reinforcing members are provided with annular shoulders which bear upon one another for preventing axial separation of the tubular sockets but which define with one another a radial gap sufficient to permit limited relative displacement of the tubular sockets in radial direction.

The inter-engagement between the shoulders, each of which engages behind the other, is claw-like and with the construction according to the present invention the forces resulting from the internal pressures which develop in the vessels and the tubular sockets are absorbed by the tubular sockets themselves, or more particularly, by the annular reinforcing members provided on these sockets. Heretofore it was necessary to provide external fittings, that is anchoring devices in prior-art constructions of the type in question, and this can now be omitted. This results in a not insubstantial reduction of the manufacturing costs, aside from the fact that it saves space which makes it possible to have the vessels closer together than herebefore, a consideration which is particularly important if one of the vessels is a regenerator and the other a combustion chamber, or if the vessels are two regenerators.

The contacting surfaces of the annular shoulders are shifted radially relative to one another during temperature and pressure changes occurring in an arrangement according to the present invention, that is the axis of one tubular socket shifts transversely of and in parallelism with the axis of the associated other tubular socket. In order to be able to obtain a particularly easy displacement of the contacting surfaces of the annular shoulders, it is advantageous to smooth these surfaces, to harden them and to coat them with graphite. It is also possible, however, to provide a rolling displacement between these surfaces, for which purpose a roller or ball bearing may be interposed between these surfaces in contact with them. Thus, in any case, friction reducing means should advantageously be provided between these surfaces, or whatever type of such friction-reducing means may be chosen in accordance with the comments above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
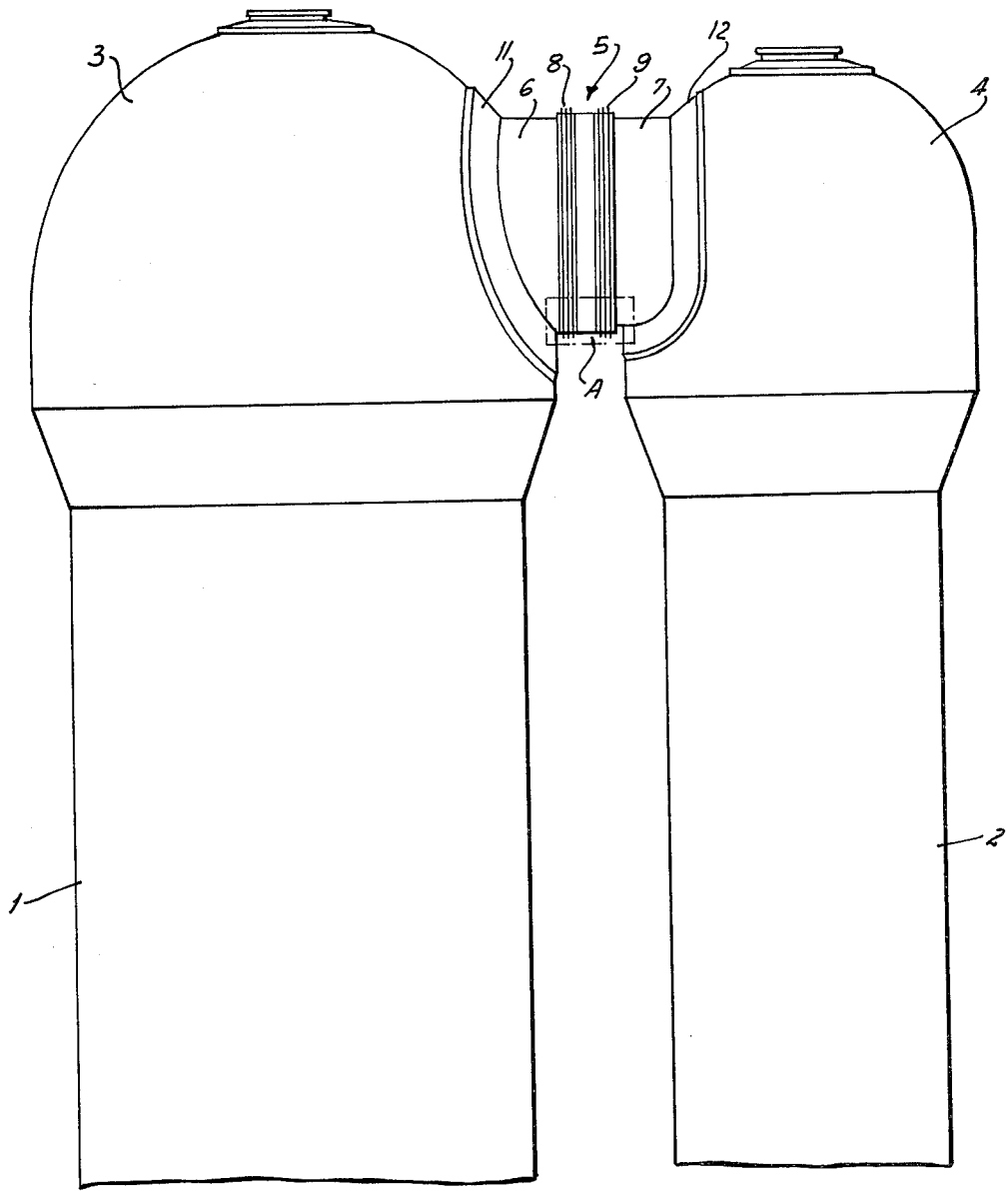
FIG. 1 is a somewhat diagrammatic detail view showing an installation provided with a connecting arrangement according to the present invention.
Figure 2:
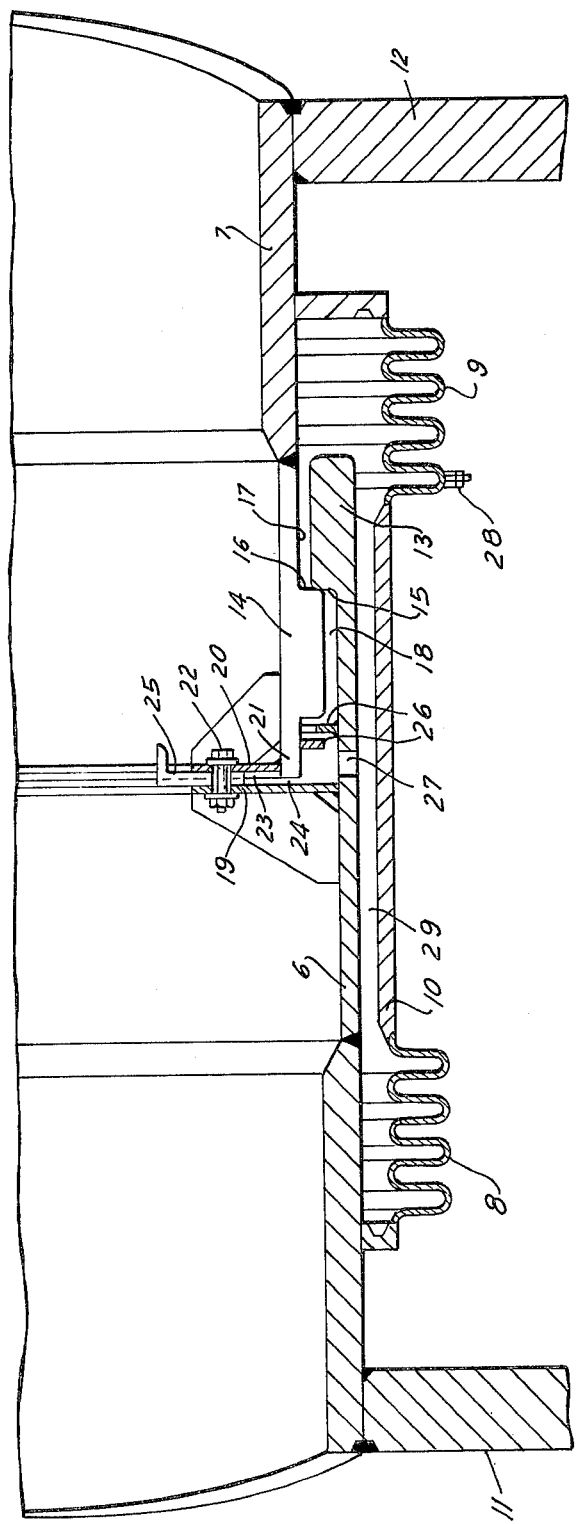
FIG. 2 is a partly sectioned fragmentary detail view of FIG. 1, illustrated on an enlarged scale.

Discussing the drawing in detail it will be seen that FIGS. 1 and 2 illustrate the connecting arrangement as employed in conjunction with two vessels, one of which is here an air heater or regenerator of a furnace, and the other of which is a combustion chamber or duct of the furnace. The regenerator is identified with reference numeral 1 and the combustion chamber or duct with reference numeral 2. The regenerator has at its upper end a cupola 3 and a similar cupola 4 is provided at the upper end of the combustion chamber 2. It is the cupolas 3 and 4 which are connected with one another by the conduit 5.

As the drawing shows, especially in FIG. 2, the conduit 5 is composed of two tubular sockets 6 and 7 of which the former is rigidly connected with the cupola 3 and the latter with the cupola 4. There if further provided a set of compensators 8 and 9 of bellows-shaped type, and between these compensators 8 and 9 there is provided a tube section 10. In the region where the sockets are connected with the cupolas 3 and 4, respectively, the surfaces of the cupolas in the illustrated embodiment, or quite generally the cupolas per se, are reinforced by reinforcements 11 and 12, respectively.

In the illustrated embodiment, and as most clearly seen in FIG. 2, the ends of the tubular sockets 6 and 7, and the sockets themselves in this case, are of different diameters. Secured rigidly, in the illustrated embodiment by welding, to the free ends of the tubular sockets 6 and 7 are annular reinforcements 13 and 14, respectively. These also have different diameters and one has an outwardly extending annular projecting whereas the other has an inwardly extending annular projection, being provided with annular shoulders 15 and 16. As the drawing shows, these shoulders 15 and 16 interengage one behind the other, because one shoulder is provided at one axial end of the reinforcement 13 and the other shoulder is provided at the opposite axial end of the reinforcement 14, so that the shoulders interengage one behind the other as illustrated. The contacting surfaces of the shoulders 15 and 16 are capable of absorbing and withstanding the significant forces resulting from the internal pressures in the regenerator 1 and the combustion chamber 2.

These aforementioned internal forces are forces which rise and decrease, that is which increase when the system is switched from the heating to the blasting period until they reach the highest value, which value they retain until the end of the blasting period whereupon a decrease takes place. With the rise in the internal pressure at the beginning of the blasting period (reference here is, of course, being made to a blast furnace having the units 1 and 2) this pressure causes an increase in the tensile forces acting upon the installation, and in the thermal expansion of the various elements which is different in the units 1 and 2 due to their different dimensions. The compensation of these different extents of expansion is effected in the present invention by the fact that the shoulders 15 and 16 have sliding freedom of radial displacement with reference to one another, so that as an expansion takes place in vertical direction (in FIG. 1) of the unit 1 with reference to the unit 2 or vice versa, such displacement is shared by the respective tubular socket 6 or 7 and results in radial displacement of the shoulders 15 and 16 with reference to one another. This is possible because between the annular reinforcements and the respective other end of the tubular socket 6 or 7 a sufficient amount of radial gap or play 17 and 18 is provided.

The abutment of the tubular sockets 6 and 7 takes place in the region of the flanges 19 and 20. The flange 19 is rigidly connected with the tubular socket 6, in the illustrated embodiment by welding; the flange 20 is welded to a reduced-diameter extension 21 of the reinforcement 14. The two flanges 19 and 20 are connected by bolts or screws 22, and a gap 23 is left between the flanges, another gap 24 being left between the flange 19 and the free edge of the extension 21. The desired width of these gaps 23 and 24 is readily achieved by inserting angle members 25 which are removed only after the components have all been installed in their desired locations. The provision of gap 24 is to clearly define the relative movement of the tubular sockets 6 and 7, and thereby of the units 1 and 2 in direction towards one another. The bolts 22, which are in appropriately dimensioned bores, further provide the possibility of retensioning the bellows-shaped compensators 8 and 9 before the assembly is completed.

A seal of labyrinthine type is provided, here in form of annular lamellaes 26 which are located between the extension 21 and the tubular socket 6. The purpose of this is to provide for a sealing of the interior of the tubular sockets 6 and 7 with respect to the surfaces of the shoulders 15 and 16, to prevent dust-like or other particular impurities from contacting these surfaces. It is evident that if such impurities could come between these surfaces, relative displacement taking place between the surfaces would cause their scratching by the particular impurities and lead to difficulties, that is to harder sliding movement of the shoulder surfaces 15 and 16, or even to more substantial problems. The seal provided by annular lamellaes 26 can of course be replaced by another type of seal.

The tubular socket which in the illustrated embodiment is designated with reference numeral 6 is further provided with at least one, and in the illustrated embodiment with a plurality of circumferentially distributed apertures 27 which facilitate a better pressure compensation between the interior of the sockets 6 and 7 on the one hand, and the annular clearance 29 defined between the socket 6, the tubular member 10 and the compensators 8 and 9. At the same time, they are intended to prevent that the pressure adjustment take place via the contacting slide surfaces of the shoulders 15 and 16, because this could again result in the movement of particular contaminants between these surfaces.

Each of the ribs of the compensators 8 and 9 is advantageously provided with an opening 28 in the downwardly directed portion (only one opening is shown) which can be closed so that condensate which may accumulate can be drained if and when necessary.

A roller or ball bearing can be interposed between the surfaces of the shoulders 15 and 16 for antifriction purposes, as mentioned earlier.

It will be understood that each of the elements described above, or two or more together, may also find a useful application in other types of constructions differing from the types described above.

While the invention has been illustrated and described as embodied in a connecting arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are antended to be comprehended within the meaning and range of equivalence of the following claims.

What is claimed as new and desired to be protected by letters patent is set forth in the appended:

1. In a furnace, a combination comprising a combustion chamber and an air heater chamber; a pair of tubular sockets each connected to and communicating with one of said chambers and each having a free end, said free ends facing toward one another; a pair of annular reinforcing members each rigidly connected with one of said free ends, one of said reinforcing members being telescoped into the other reinforcing member and defining therewith a radial gap communicating with the interior of said reinforcing members and sufficient to permit limited relative displacement of said tubular sockets in radial direction, said reinforcing members being provided with respective external and internal shoulders which project into said gap and bear upon one another for preventing axial separation of said tubular sockets; and means for shielding said shoulders against contact with the contents of said sockets and reinforcing members, said shielding means including a labyrinthine-type seal mounted in said gap intermediate said shoulders and the region where said gap communicates with said interior.

2. An arrangement as defined in claim 1, and further comprising compensating means bridging said first and second tubular sockets and operative to compensate for thermal expansions; and contractions of the same.

3. An arrangement as defined in claim 1, one of said reinforcing members having a radially outwardly projecting annular portion provided with an annular shoulder at its one axial end, and the other reinforcing member having a radially inwardly projecting annular portion provided with an annular shoulder at its other axial end, said shoulders being axially juxtaposed and bearing upon one another.

4. An arrangement as defined in claim 4, and further comprising anti-friction means interposed between said shoulders.

5. An arrangement as defined in claim 1, and further comprising compensating means bridging said first and second tubular sockets so as to compensate for thermal shifting of the same, said compensating means including one bellows member surrounding said first socket and having one end rigid with the same and an open end facing said second socket, an other bellows member surrounding said second socket and having one end rigid with the same and an open end facing said first socket, and a tubular member surrounding said sockets and reinforcing members intermediate and with clearance from said open ends and being sealingly connected with the latter.

6. An arrangement as defined in claim 5, wherein at least one of said sockets is provided with at least one aperture communicating with said clearance.

7. An arrangement as defined in claim 5, and further comprising at least one blockable drain opening in at least one of said bellows members for draining of liquid from the same.

* * * * *

UNITED STATES PATENT AND TRADEMARK OFFICE
CERTIFICATE OF CORRECTION

PATENT NO. : 3,901,646
DATED : August 26, 1975
INVENTOR(S) : Willi Coenders and Franz Trockel It is certified that error appears in the above-identified patent and that said Letters Patent are hereby corrected as shown below:

[73] Assignee: Heinrich Koppers GmbH, Essen, Germany

Signed and Sealed this twentieth Day of January 1976

[SEAL]

Attest:

RUTH C. MASON
*Attesting Officer*

C. MARSHALL DANN
*Commissioner of Patents and Trademarks*